United States Patent Office 2,814,180
Patented Nov. 26, 1957

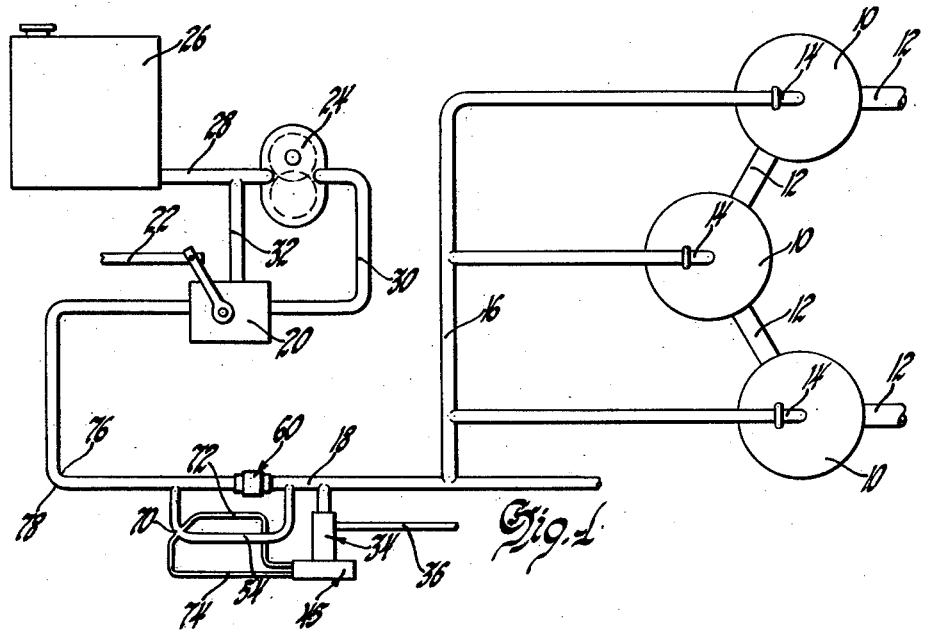
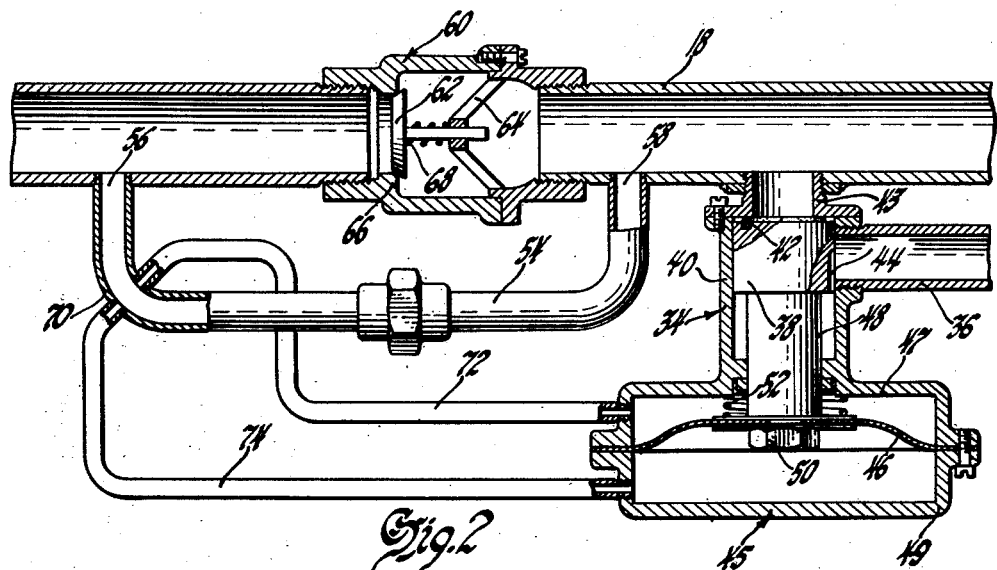
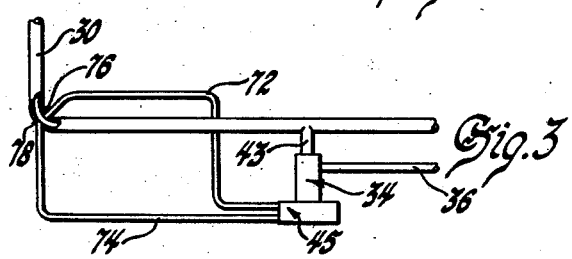

2,814,180

FLOW RESPONSIVE DUMP VALVE FOR GAS TURBINE FUEL SYSTEMS AND THE LIKE

Joseph P. Hession, Indianapolis, Ind., assignor to General Motors Corporation, Detroit, Mich., a corporation of Delaware Application July 9, 1953, Serial No. 367,022

5 Claims. (Cl. 60—39.09)

This invention relates to fluid systems and more particularly to a flow responsive actuator for such systems.

The invention is particularly applicable to fuel systems of aircraft gas turbine engines of the type incorporating a compressor supplying air under pressure to a combustion chamber for fuel admixture therein and a turbine driven by the exhaust gases of the combustion chamber and connected to the compressor to drive the same, the excess energy of the exhaust gases over that required to drive the compressor being utilized to furnish additional turbine shaft power or to furnish jet propulsion. The fuel supply shutoff of a gas turbine engine is located in the fuel supply line at some distance from the combustion chamber fuel nozzles, and when the engine is shut off residual heat from the combustion chambers expands the fuel in the supply line causing the fuel to discharge through the nozzles and burn in the combustion chambers, this occurrence being known as afterfire.

Afterfire is objectionable because it may damage the engine bearings and other parts for the cooling system of the engine ceases on engine shutdown. Afterfire is also objectionable because the pilot becomes concerned about his safety and about damage to the engine even though he is not in danger and actual damage to the engine may not result. The fuel supply line is therefore supplied with a dump valve arranged to open on engine shutdown and drain the contents of the fuel supply line overboard to atmosphere to prevent afterfire. The conventional dump valve is pressure operated, that is, it opens whenever the pressure in the fuel supply line falls below a predetermined setting. Such valves are objectionable during engine starting as they remain open until sufficient pressure is built up in the fuel supply line to close them thereby wasting fuel overboard and reducing the speed with which the engine starts.

An object of the invention is to provide a dump valve with a control means that will open the valve whenever fuel delivery ceases and that will close the valve whenever fuel delivery begins and that permits drainage only when flow has ceased.

Another object of the invention is to provide a control for valves and the like of fluid systems which is operative as a result of fluid flow and nonfluid flow in the system.

Further objects and advantages of the present invention will be apparent from the following description, reference being had to the accompanying drawings wherein a preferred form of the present invention is clearly shown.

In the drawings:

Fig. 1 is a schematic representation of the fuel system of a gas turbine engine incorporating the invention;

Fig. 2 is an enlarged portion of Fig. 1, partially broken away, and illustrating the flow responsive control device of the invention.

Fig. 3 is a schematic representation of a modified arrangement of the invention.

Referring now to Fig. 1 in detail, the air pressurized combustion chambers 10 of the engine are connected by air pressure balancing tubes 12 and are supplied with liquid fuel by the spray nozzles 14 from the fuel manifold 16 which receives fuel from the main fuel supply line 18. A fuel control 20 determines the extent of fuel delivery to the fuel supply line 18 in accordance with the position of the throttle and fuel shutoff lever 22. A pump 24 intakes fuel from the fuel reservoir 26 by line 28 and delivers the same to the fuel control 20 by line 30. A bypass line 32 permits excess fuel from the pump to recirculate when the throttle is retarded or cut off. The pump 24 may be engine driven or driven by other means.

Referring additionally to Fig. 2, a dump or drain valve 34 is tapped to a low point in the fuel supply line 18 between the fuel control 20 and fuel manifold 16, to drain the contents of the fuel manifold overboard to atmosphere through a drain line 36 when the flow of fuel to the engine is shut off by the fuel control 20. The dump valve 34 includes a piston 38 slidable in a cylinder 40, which cylinder is open endwise to the fuel supply line 18 through a conduit 43 and axially to the drain line 36. An O-ring 42 on the piston seats on the member 43 when the piston is in uppermost position to cut off communication between the fuel supply conduit 18 and the drain conduit 36. An axial groove 44 prevents fluid entrapment beneath the piston and allows the piston to move downward and place the fuel supply line 18 and the drain conduit 36 in communication with each other. An actuator 45 provides control for the drain valve 34 and includes upper and lower chambers 47 and 49 having a common movable wall or flexible diaphragm 46 which connects to the piston 38 by a stem 48 and nut 50. A coil spring 52 biases the movable wall 46 and associated piston 38 downward to place the fuel supply conduit 18 and drain conduit 36 in communication with each other when fuel flow is cut off. A bypass conduit 54 is located upstream of the drain valve 34 and communicates with the conduit 18 at 56 and 58. In order to insure some flow through the bypass conduit 54, the fuel supply conduit 18 is provided with a suitable pressure drop creating means between the inlet 56 and outlet 58 of the bypass passage 54. The means shown includes a restrictor valve 60 having a poppet 62 slidably carried by radial legs 64 and lightly urged against valve seat 66 by a weak spring 68. The bypass passage 54 is provided with an elbow bend 70 along its length and pressure taps 72 and 74 connect the inner and outer sides of the bend 70 to the chambers 47 and 49.

It is well known that the dynamic action of a flowing fluid in a pipe bend causes a difference between the pressures at the inner and outer curves of the bend with the pressure at the outer side of the bend being greater than the pressure at the inner side. The differential pressure between the inner and outer curves of the bend is equal to the density of the fluid times the differential radius between the inner and outer curves times the average velocity of the fluid in the bend squared over the radius of the inner curve; for example, a two-gallon per minute flow of kerosene having a density of 1.51 slugs per cubic foot and an average velocity of 20.4 feet per second in a bypass passage of two-tenths of an inch diameter with an inner bend radius of two-tenths of an inch will produce a differential pressure of 4.36 pounds per square inch in the arrangement shown. By making the spring 52 of the actuator of lesser force than the force generated at a desired rate of fuel flow, the drain valve 34 remains closed as long as fuel flow continues and opens whenever fuel flow ceases; for example, the spring is designed to exert a force of approximately two pounds per square inch to open the valve in the arrangement shown. The spring 68 need only be strong enough to insure a two-gallon per minute flow in the bypass passage 54 in the arrangement shown.

The above example is given only by way of illustration and it should be obvious that the drain valve operates on the basis of actual delivery and nondelivery of fuel to the combustion chamber rather than the pressure of fuel in the fuel supply line. When the fuel supply to the engine is initiated by the fuel control 20, the drain valve 34 is open and the restrictor valve 62 closed. The initial charge of fuel is diverted or partially diverted through the bend 70 of the bypass passage 54 and the differential pressure generated thereby closes the drain valve 34 before the fuel flow reaches the same, the spatial distance between the bypass passage and the drain valve being great enough to insure sufficient time for closing of the drain valve. The drain valve remains closed during fuel flow to the combustion chambers due to the maintenance of the pressure differential by the flow of fuel through the pipe bend 70 which flow need only constitute a minor portion of the actual flow to the combustion chambers as set by the relatively light restriction offered by the restrictor valve. A simple flow bean or restrictor orifice may be used instead of a restrictor valve if desired to induce flow through the bypass passage 54. The bypass passage 54 may be eliminated entirely if desired by connecting the pressure taps 72 and 74 to a suitable bend in the fuel supply conduit 18 such as at 76 and 78. This arrangement is shown in Fig. 3. When the throttle lever 22 is moved to cause the fuel control 20 to shut off fuel flow to the combustion chambers, the pressure differential at the bypass passage bend 70 ceases and the spring 52 opens the drain valve 34 venting the fuel manifold 16 and supply line 18 to atmosphere so that fuel pressure buildup cannot take place and cause afterfire.

While the preferred embodiment of the invention has been described fully in order to explain the principles of the invention, it is to be understood that modifications in structure may be made by the exercise of skill in the art within the scope of the invention, which is not to be regarded as limited by the detailed description of the preferred embodiment.

I claim:
1. A fluid system comprising a fluid conduit having pressure drop creating means therein, a fluid bypass passage having a bend therein and having an inlet and an outlet with the fluid conduit on opposite sides of the pressure drop creating means, a servo actuator having opposed chambers and a common movable wall between the chambers, a pressure tap from one chamber to the inner side of the bend and a pressure tap from the other chamber to the outer side of the bend, a control device connected to the servo actuator and operable by movement of the movable wall, and means for initiating and discontinuing fluid flow through the fluid conduit and the associated fluid bypass passage to change the position of the movable wall and associated control device.

2. A fluid system comprising a fluid conduit having pressure drop creating means therein, a fluid bypass passage having a bend therein and having an inlet and an outlet with the fluid conduit on opposite sides of the pressure drop creating means, a movable control member, servo means for the control member operable by differential fluid pressure to move the control member, and pressure taps from the inner and outer sides of the band to the servo means to supply the differential fluid pressure thereto on flow of fluid in the bend.

3. A combustion system for gas turbine engines comprising an air pressurized combustion chamber having a fuel supply conduit connected thereto, a source of liquid fuel under pressure connectable and disconnectable with the conduit for delivery and nondelivery of fuel to the chamber, a drain valve connected to the conduit and operable to open and close the conduit to atmosphere, an actuator for the drain valve including means normally urging the valve open and means operable by differential fluid pressure to overcome the urging means and close the valve, a bypass passage having a bend and an inlet and an outlet with the conduit, pressure drop creating means in the conduit between the inlet and the outlet to cause fuel flow in the passage on delivery of fuel to the chamber, and pressure taps from the inner and outer sides of the bend to the overcoming means to supply the differential fluid pressure thereto on delivery of fuel to the chamber, the actuator being operable by source delivery of fuel to the chamber to close the drain valve and by nondelivery to open the drain valve to drain the conduit and prevent afterfire in the chamber.

4. A combustion system for gas turbine engines comprising an air pressurized combustion chamber having a fuel supply conduit connected thereto, a source of liquid fuel under pressure connectable and disconnectable with the conduit for delivery and nondelivery of fuel to the chamber, a drain valve connected to the conduit and operable to open and close the conduit to atmosphere, an actuator for the drain valve including spring means normally urging the valve open and movable wall means operable by differential fluid pressure to overcome the urging means and close the valve, a bypass passage upstream of the drain valve having a bend and an inlet and an outlet with the conduit, pressure drop creating means in the conduit between the inlet and the outlet to cause fuel flow in the passage on delivery of fuel to the chamber, and pressure taps from the inner and outer sides of the bend to the overcoming means to supply the differential fluid pressure thereto on delivery of fuel to the chamber, the actuator being operable by source delivery of fuel to the chamber to close the drain valve and by nondelivery to open the drain valve to drain the conduit and prevent afterfire in the chamber.

5. A combustion system for gas turbine engines comprising an air pressurized combustion chamber having a fuel supply conduit connected thereto, a source of liquid fuel under pressure connectable and disconnectable with the conduit for delivery and nondelivery of fuel to the chamber, a drain valve connected to the conduit and operable to open and close the conduit to atmosphere, an actuator for the drain valve including spring means normally urging the valve open and movable wall means operable by differential fluid pressure to overcome the urging means and close the valve, a bypass passage upstream of the drain valve having a bend and an inlet and an outlet with the conduit, a restrictor valve in the conduit between the inlet and the outlet to cause fuel flow in the passage on delivery of fuel to the chamber, and pressure taps from the inner and outer sides of the bend to the overcoming means to supply the differential fluid pressure thereto on delivery of fuel to the chamber, the actuator being operable by source delivery of fuel to the chamber to close the drain valve and by nondelivery to open the drain valve to drain the conduit and prevent afterfire in the chamber.

References Cited in the file of this patent
UNITED STATES PATENTS

| | | |
|---|---|---|
| 1,181,490 | Levin | May 2, 1916 |
| 1,479,663 | Herz | Jan. 1, 1924 |
| 1,558,624 | Park | Oct. 27, 1925 |
| 2,446,013 | Kuyper | July 27, 1948 |
| 2,508,260 | Holley | May 16, 1950 |
| 2,573,724 | Neal | Nov. 6, 1951 |
| 2,664,701 | Allen et al. | Jan. 5, 1954 |
| 2,712,218 | Ritter | July 5, 1955 |